United States Patent
Akiyoshi et al.

(10) Patent No.: US 9,577,475 B2
(45) Date of Patent: Feb. 21, 2017

(54) ELECTRONIC DEVICE, FEED UNIT, AND FEED SYSTEM FOR RELIABLY INFORMING USER OF ELECTRONIC DEVICE STATE DURING WIRELESS ELECTRIC POWER TRANSMISSION

(71) Applicant: SONY CORPORATION, Minato-ku (JP)

(72) Inventors: Koichi Akiyoshi, Chiba (JP); Yoichi Uramoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 218 days.

(21) Appl. No.: 14/352,777

(22) PCT Filed: Nov. 13, 2012

(86) PCT No.: PCT/JP2012/079391
§ 371 (c)(1),
(2) Date: Apr. 18, 2014

(87) PCT Pub. No.: WO2013/080786
PCT Pub. Date: Jun. 6, 2013

(65) Prior Publication Data
US 2014/0239893 A1 Aug. 28, 2014

(30) Foreign Application Priority Data

Nov. 29, 2011 (JP) .................. 2011-260058
Apr. 18, 2012 (JP) .................. 2012-094335

(51) Int. Cl.
*H02J 17/00* (2006.01)
*H01M 10/44* (2006.01)
(Continued)

(52) U.S. Cl.
CPC .............. *H02J 17/00* (2013.01); *H01M 10/44* (2013.01); *H01M 10/46* (2013.01);
(Continued)

(58) Field of Classification Search
CPC ............ H02J 17/00; H02J 7/025; H02J 5/005; H02J 7/0047; H01M 10/488; H01M 10/44; H01M 10/46; H04B 5/0075; H04B 5/0037
See application file for complete search history.

(56) References Cited

U.S. PATENT DOCUMENTS 5,485,073 A * 1/1996 Kasashima ........... G06F 1/1616
320/106
5,998,968 A * 12/1999 Pittman ................. H02J 7/0093
320/130
(Continued)

FOREIGN PATENT DOCUMENTS

CN 101483358 A 7/2009
JP 2001-102974 A 4/2001
(Continued)

OTHER PUBLICATIONS

International Search Report issued Feb. 12, 2013 in PCT/JP2012/079391.
(Continued)

*Primary Examiner* — Naum B Levin
(74) *Attorney, Agent, or Firm* — Chip Law Group

(57) ABSTRACT

An electronic device includes: a power receiving section configured to receive electric power transmitted using a magnetic field or an electric field; and a state informing section configured to inform a device state of the electronic device, by using the electric power received by the power receiving section. When an abnormal state is detected as the device state, the state informing section also informs the abnormal state by using the received electric power. A feed unit includes: a power transmission section configured to perform electric power transmission using a magnetic field or an electric field, to a device to be fed; and a control section configured to continue the electric power transmission by (Continued)

the power transmission section, even when an abnormal state in the device to be fed is detected.

16 Claims, 8 Drawing Sheets

(51) Int. Cl.
*H01M 10/46* (2006.01)
*H02J 5/00* (2016.01)
*H02J 7/02* (2016.01)
*H01M 10/48* (2006.01)
*H02J 7/00* (2006.01)
*H04B 5/00* (2006.01)

(52) U.S. Cl.
CPC ........... *H01M 10/488* (2013.01); *H02J 5/005* (2013.01); *H02J 7/025* (2013.01); *H02J 7/0047* (2013.01); *H04B 5/0037* (2013.01); *H04B 5/0075* (2013.01)

(56) References Cited

U.S. PATENT DOCUMENTS

| | | | | |
|---|---|---|---|---|
| 6,316,909 | B1* | 11/2001 | Honda | G01R 31/3648 320/108 |
| 7,417,402 | B2* | 8/2008 | Kim | H02J 7/025 320/108 |
| 7,528,579 | B2* | 5/2009 | Pacholok | H02J 7/022 320/130 |
| 7,622,896 | B2* | 11/2009 | Nakagawa | H02J 7/047 320/150 |
| 7,626,353 | B2* | 12/2009 | Kanouda | G06F 1/26 307/46 |
| 7,741,812 | B2* | 6/2010 | Ukon | G01R 19/16542 320/132 |
| 7,876,069 | B2* | 1/2011 | Norimatsu | H01M 8/04246 320/132 |
| 8,030,887 | B2* | 10/2011 | Jung | H02J 7/025 307/104 |
| 8,143,862 | B2* | 3/2012 | Li | H02J 7/022 320/145 |
| 8,148,939 | B2* | 4/2012 | Kitagawa | H01M 10/46 320/112 |
| 8,188,854 | B2* | 5/2012 | Yamashita | H02J 7/025 320/108 |
| 8,484,496 | B2* | 7/2013 | Anderson | H02J 7/0091 713/320 |
| 8,648,565 | B2* | 2/2014 | Mitsutani | B60K 6/445 320/103 |
| 8,890,470 | B2* | 11/2014 | Partovi | H01F 7/0252 320/108 |
| 8,890,475 | B1* | 11/2014 | Becker | B60L 11/1827 180/65.29 |
| 9,018,900 | B2* | 4/2015 | Yamamoto | H02J 7/025 320/108 |
| 9,225,185 | B2* | 12/2015 | Ham | H02J 7/0047 |
| 9,252,463 | B2* | 2/2016 | Yang | H01M 10/44 |
| 2003/0090239 | A1* | 5/2003 | Sakakibara | H02J 7/0042 320/166 |
| 2010/0001845 | A1* | 1/2010 | Yamashita | H02J 7/025 340/10.4 |
| 2012/0049621 | A1* | 3/2012 | Shinoda | B60L 3/0092 307/10.1 |
| 2014/0333257 | A1* | 11/2014 | Akiyoshi | H01M 10/44 320/108 |

FOREIGN PATENT DOCUMENTS

| | | |
|---|---|---|
| JP | 2002-034169 A | 1/2002 |
| JP | 2005-110399 A | 4/2005 |
| JP | 2005-278273 A | 10/2005 |
| JP | 2008-206233 A | 9/2008 |
| JP | 2010-063245 A | 3/2010 |
| JP | 2011-172299 A | 9/2011 |
| WO | WO 00/27531 A1 | 5/2000 |

OTHER PUBLICATIONS

Chinese Office Action for Chinese Application No. 201280057512.0 issued Nov. 12, 2015 wite English Translation.

* cited by examiner

ELECTRONIC DEVICE, FEED UNIT, AND FEED SYSTEM FOR RELIABLY INFORMING USER OF ELECTRONIC DEVICE STATE DURING WIRELESS ELECTRIC POWER TRANSMISSION

TECHNICAL FIELD

The present disclosure relates to a feed system that performs non-contact electric power supply (power transmission, electric power transmission) to a device to be fed such as an electronic device, as well as a feed unit and an electronic device applied to such a feed system.

BACKGROUND ART

In recent years, attention has been given to a feed system (a non-contact feed system, a wireless charging system) that performs non-contact electric power supply (power transmission, electric power transmission) to a CE device (Consumer Electronics Device) such as a mobile phone and a mobile music player. This makes it possible to start charging merely by placing an electronic device (a secondary-side device) on a charging tray (a primary-side device), instead of starting charging by inserting (connecting) a connector of a power-supply unit such as an AC adapter into the device. In other words, terminal connection between the electronic device and the charging tray becomes unnecessary.

As a method of thus performing non-contact electric power supply, an electromagnetic induction method is well known. In addition, in recent years, a non-contact feed system using a method called a magnetic resonance method utilizing an electromagnetic resonance phenomenon has also been receiving attention. Such non-contact feed systems are disclosed in, for example, Patent Literatures 1 to 6.

CITATION LIST

Patent Literature

Patent Literature 1: Japanese Unexamined Patent Application Publication No. 2001-102974
Patent Literature 2: WO 00/27531
Patent Literature 3: Japanese Unexamined Patent Application Publication No. 2008-206233
Patent Literature 4: Japanese Unexamined Patent Application Publication No. 2002-34169
Patent Literature 5: Japanese Unexamined Patent Application Publication No. 2005-110399
Patent Literature 6: Japanese Unexamined Patent Application Publication No. 2010-63245

SUMMARY OF THE INVENTION

Meanwhile, in a non-contact feed system like those described above, there is a case in which a device to be fed such as an electronic device incorporates a means of informing a device state thereof to outside (for example, a technique of informing a device state according to a lighting state of a light-emission element). In such a case, it is desired to improve convenience of a user, by reliably informing the user of the device state at that point in time (by preventing false determination of the device state by the user, and the like).

Therefore, it is desirable to provide an electronic device, a feed unit, and a feed system which are capable of improving convenience of a user, when electric power transmission (power transmission) is performed using a magnetic field or an electric field.

An electronic device according to an embodiment of the present disclosure includes: a power receiving section configured to receive electric power transmitted using a magnetic field or an electric field; and a state informing section configured to inform a device state of the electronic device, by using the electric power received by the power receiving section. When an abnormal state is detected as the device state, the state informing section also informs the abnormal state by using the received electric power.

A feed system according to an embodiment of the present disclosure includes: one or a plurality of the electronic devices (devices to be fed) according to the above-described embodiment of the present disclosure; and a feed unit configured to perform electric power transmission using a magnetic field or an electric field, to this electronic device.

In the electronic device and the feed system according to the above-described embodiments of the present disclosure, when the abnormal state is detected as the device state of the electronic device, the abnormal state is also informed to outside, by using the electric power (the received electric power) transmitted using the magnetic field or the electric field. This may avoid, for example, stopping of informing operation due to absence of the received electric power, unlike a case in which electric power transmission using a magnetic field or an electric field is stopped when an abnormal state is detected. Therefore, false determination of the device state by a user, due to, for example, impracticability of distinguishing between information about the abnormal state and information about other device state (for example, a state in which charging based on the received electric power is completed), is prevented.

A feed unit according to an embodiment of the present disclosure includes: a power transmission section configured to perform electric power transmission using a magnetic field or an electric field, to a device to be fed; and a control section configured to continue the electric power transmission by the power transmission section, even when an abnormal state in the device to be fed is detected.

In the feed unit according to the above-described embodiment of the present disclosure, the electric power transmission using the magnetic field or the electric field by the power transmission section is continued, even when the abnormal state in the device to be fed is detected. This may avoid, for example, stopping of operation due to absence of received electric power in the device to be fed (for example, operation of informing a device state to outside), unlike a case in which electric power transmission using a magnetic field or an electric field is stopped when an abnormal state is detected. Therefore, a decrease in convenience of a user due to such stopping of the operation (such as false determination of a device state by the user) is prevented.

According to the electronic device and the feed system of the above-described embodiments of the present disclosure, when the abnormal state is detected as the device state of the electronic device, the abnormal state is informed to the outside, by using the electric power (the received electric power) transmitted using the magnetic field or the electric field. Therefore, false determination of the device state by a user, due to, for example, impracticability of distinguishing between information about the abnormal state and information about other device state is allowed to be prevented. Hence, convenience of the user when the electric power transmission using the magnetic field or the electric field is performed is allowed to be improved.

According to the feed unit of the above-described embodiment of the present disclosure, the electric power transmission using the magnetic field or the electric field by the power transmission section is continued, even when the abnormal state in the device to be fed is detected. Therefore, stopping of operation due to the absence of the received electric power in the device to be fed is allowed to be avoided. Hence, convenience of a user when the electric power transmission using the magnetic field or the electric field is performed is allowed to be improved.

MODES FOR CARRYING OUT THE INVENTION

An embodiment of the present disclosure will be described below in detail with reference to the drawings. It is to be noted that the description will be provided in the following order.
1. Embodiment (an example in which even an abnormal state of a device to be fed is informed to outside based on received electric power)
2. Modifications (such as an example of a feed system performing non-contact electric power transmission by using an electric field)
<Embodiment>
[Overall Configuration of Feed System 4]

Figure 1:
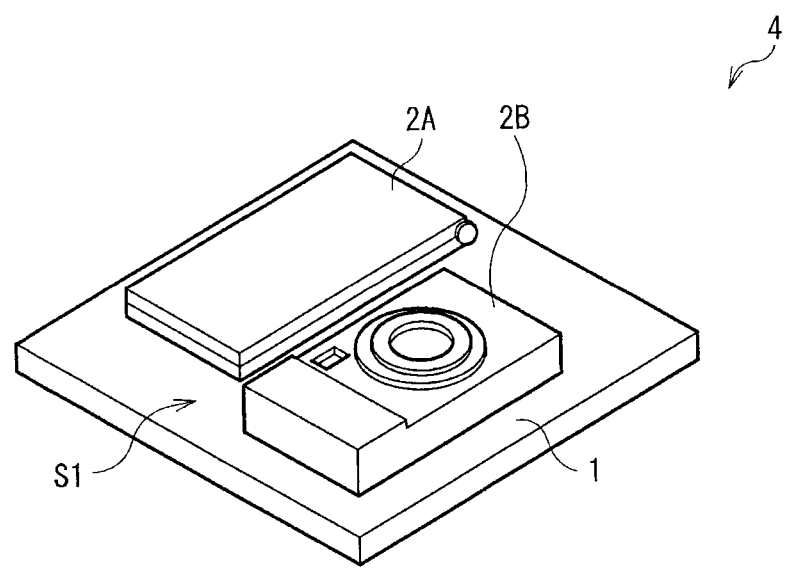
FIG. 1 is a perspective view illustrating an appearance configuration example of a feed system according to an embodiment of the present disclosure.
Figure 2:
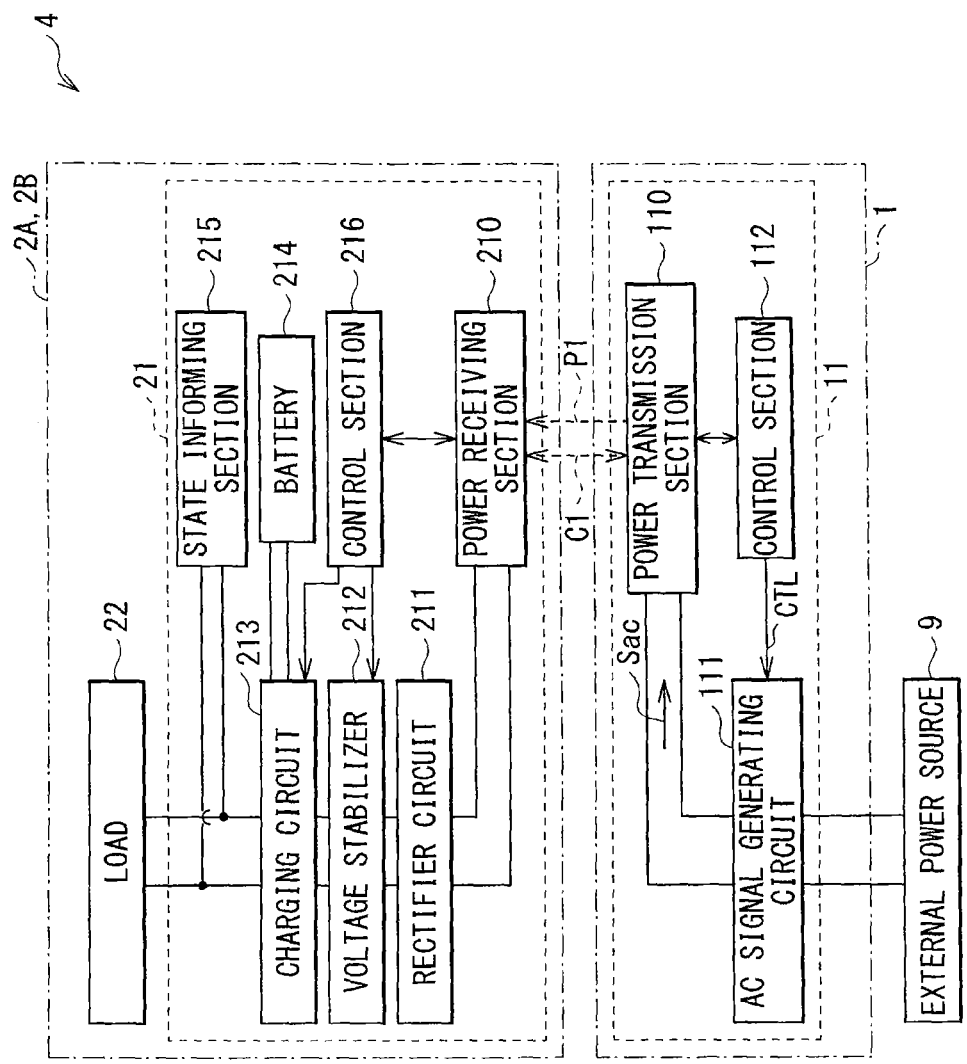
FIG. 2 is a block diagram illustrating a detailed configuration example of the feed system illustrated in FIG. 1.

FIG. 1 illustrates an appearance configuration example of a feed system (a feed system 4) according to an embodiment of the present disclosure, and FIG. 2 illustrates a block configuration example of this feed system 4. The feed system 4 is a system (a non-contact type feed system) that performs electric power transmission (power supply, feeding, power transmission) in a non-contact manner by using a magnetic field (by utilizing magnetic resonance or the like; likewise hereinafter). This feed system 4 includes a feed unit 1 (a primary-side device) and one or a plurality of electronic devices (here, two electronic devices 2A and 2B; secondary-side devices).

In this feed system 4, electric power transmission from the feed unit 1 to the electronic devices 2A and 2B may be performed by placing the electronic devices 2A and 2B on (or, in proximity to) a feeding surface (a power transmission surface) S1 in the feed unit 1, as illustrated in FIG. 1, for example. Here, in consideration of a case in which the electric power transmission to the electronic devices 2A and 2B is performed simultaneously or time-divisionally (sequentially), the feed unit 1 is shaped like a mat (a tray) in which the area of the feeding surface S1 is larger than the electronic devices 2A and 2B to be fed and the like.

(Feed Unit 1)

The feed unit 1 is a unit (a charging tray) that performs the electric power transmission (power transmission) to the electronic devices 2A and 2B by using a magnetic field as described above. This feed unit 1 may include, for example, a power transmission unit 11 that includes a power transmission section 110, an alternating-current (AC) signal generating circuit (a high-frequency power generating circuit) 111, and a control section 112, as illustrated in FIG. 2.

The power transmission section 110 is configured to include a power transmission coil (a primary-side coil) L1 as well as capacitors (resonance capacitors) C1$p$ and C1$s$, which will be described later, and the like. The power transmission section 110 performs electric power transmission (power transmission) using an alternating field to each of the electronic devices 2A and 2B (specifically, a power receiving section 210 to be described later), by utilizing the power transmission coil L1 as well as the capacitors C1$p$ and C1$s$ (see an arrow P1 in FIG. 2). Specifically, the power transmission section 110 has a function of emitting a magnetic field (a magnetic flux) from the feeding surface S1 towards the electronic devices 2A and 2B. This power transmission section 110 also has a function of performing predetermined mutual communication operation with the power receiving section 210 to be described later (see an arrow C1 in FIG. 2).

The AC signal generating circuit 111 may be, for example, a circuit that generates a predetermined AC signal S$ac$ (high-frequency electric power) intended to perform power transmission, by using electric power supplied from an external power source 9 (a host power source) of the feed unit 1. The AC signal generating circuit 111 as described above may be configured using, for example, a switching amplifier to be described later. It is to be noted that examples of the external power source 9 may include a USB (Universal Serial Bus) 2.0 power source (power supply ability: 500 mA, and power supply voltage: about 5 V) provided in a PC (Personal Computer) etc.

The control section 112 performs various kinds of control operation in the entire feed unit 1 (the entire feed system 4). Specifically, other than controlling the power transmission operation and the communication operation performed by the power transmission section 110, the control section 112 may have, for example, a function of controlling optimization of transmitted power and authenticating a secondary-side device. The control section 112 may further have a function of determining that the secondary-side device is on the primary-side device, and a function of detecting a mixture such as dissimilar metal. Here, when the above-described power transmission control is performed, operation of the AC signal generating circuit 111 is controlled using a predetermined control signal CTL to be described later. In addition, this control section 112 also has a function of performing modulation processing based on pulse width modulation (PWM) to be described later, by using the control signal CTL.

(Electronic Devices 2A and 2B)

The electronic devices 2A and 2B each may be, for example, any of stationary electronic devices represented by television receivers, mobile electronic devices containing a rechargeable battery (a battery) represented by mobile phones and digital cameras, and the like. As illustrated in, for example, FIG. 2, the electronic devices 2A and 2B each include a power receiving unit 21, and a load 22 that performs predetermined operation (operation that allows functions of serving as the electronic device to be performed) based on electric power supplied from this power receiving unit 21. Further, the power receiving unit 21 includes the power receiving section 210, a rectifier circuit 211, a voltage stabilizer 212, a charging circuit 213 (a charging section), a battery 214 (a secondary battery), a state informing section 215, and a control section 216.

The power receiving section 210 is configured to include a power receiving coil (a secondary-side coil) L2 and capacitors $C2p$ and $C2s$ (resonance capacitors), which will be described later, and the like. The power receiving section 210 has a function of receiving electric power transmitted from the power transmission section 110 in the feed unit 1 (power transmission), by utilizing the power receiving coil L2 as well as the resonance capacitors $C2p$ and $C2s$. This power receiving section 210 also has a function of performing the above-described predetermined mutual communication operation with the power transmission section 110 (see the arrow C1 in FIG. 2).

The rectifier circuit 211 is a circuit that rectifies electric power (AC power) supplied from the power receiving section 210, and generates DC power.

The voltage stabilizer 212 is a circuit that performs predetermined voltage stabilization operation based on the DC power supplied from the rectifier circuit 211.

The charging circuit 213 is a circuit used to perform charging to the battery 214, based on the DC power supplied from the voltage stabilizer 212 after the voltage stabilization.

The battery 214 stores electric power according to the charging by the charging circuit 213, and may be configured using, for example, a rechargeable battery (a secondary battery) such as a lithium ion battery.

The state informing section 215 informs (notifies, or indicates) a device state of its own (here, the electronic device 2A or the electronic device 2B) to outside (a user, etc.). Specifically, there is provided a function of informing such a device state to the outside, by using, for example, a lighting state (a display state) of a light-emission element to be described later, or sound output through a speaker, etc. In addition, the state informing section 215 distinguishes, as the device state, each of a state of charging to the battery 214 by the charging circuit 213, and a state following completion of charging by the charging circuit 213, as well as an abnormal state of the battery 214, and informs the distinguished device state. It is to be noted that a detailed configuration of this state informing section 215 will be described later (FIG. 3).

The control section 216 performs various kinds of control operation in each of the entire electronic devices 2A and 2B (the entire feed system 4). Specifically, other than controlling the power receiving operation and the communication operation by the power receiving section 110, the control section 216 may have, for example, a function of controlling operation of each of the voltage stabilizer 212, the charging circuit 213, and the like.

[Detailed Configuration of Feed Unit 1 as Well as Electronic Devices 2A and 2B]

Figure 3:
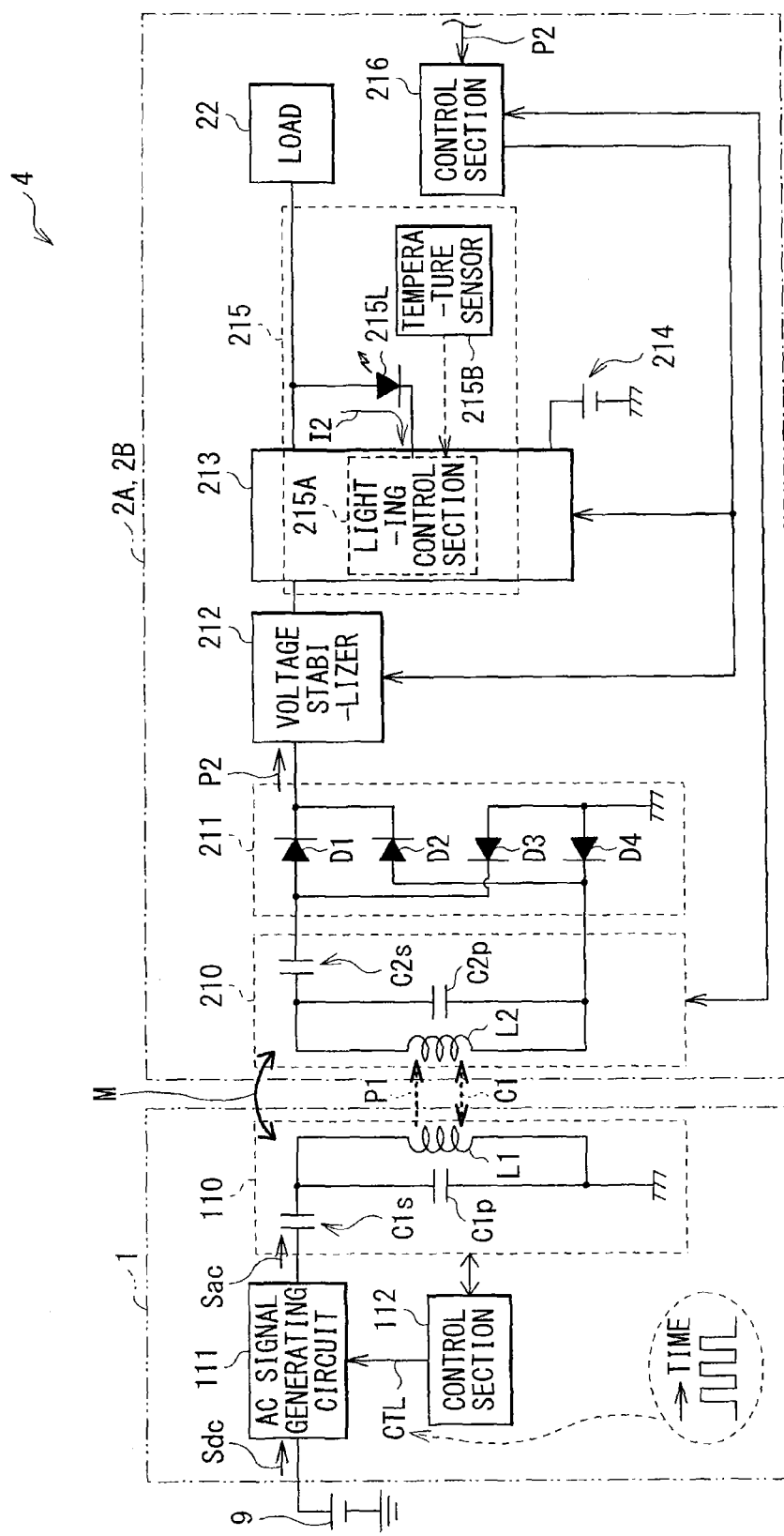
FIG. 3 is a circuit diagram illustrating a detailed configuration example of each block illustrated in FIG. 2.

FIG. 3 illustrates a detailed configuration example of each block in the feed unit 1 as well as the electronic devices 2A and 2B illustrated in FIG. 2, in a circuit diagram.

(Power Transmission Section 110)

The power transmission section 110 includes the power transmission coil L1 provided to perform electric power transmission using a magnetic field (to generate a magnetic flux), and the capacitors $C1p$ and $C1s$ that form, together with this power transmission coil L1, an LC resonance circuit. The capacitor $C1s$ is electrically connected to the power transmission coil L1 in series. In other words, one end of the capacitor $C1s$ and one end of the power transmission coil L1 are connected to each other. Further, the other end of the capacitor $C1s$ and the other end of the power transmission coil L1 are connected to the capacitor $C1p$ in parallel. A connection end between the power transmission coil L1 and the capacitor $C1p$ is grounded.

The LC resonance circuit configured of the power transmission coil L1 as well as the capacitors $C1p$ and $C1s$, and an LC resonance circuit, which will be described later and configured of the power receiving coil L2 as well as the capacitors $C2s$ and $C2p$, are magnetically coupled to each other. As a result, LC resonance operation is performed based on a resonance frequency that is substantially the same as the high-frequency electric power (the AC signal Sac) generated by the AC signal generating circuit 111 to be described below.

(AC Signal Generating Circuit 111)

Figure 4:
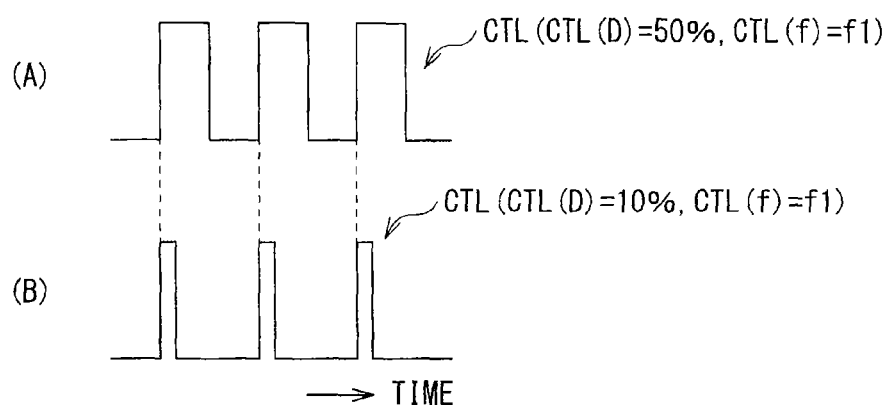
FIG. 4 is a timing waveform diagram illustrating an example of a control signal for an AC signal generating circuit.

The AC signal generating circuit 111 is configured using a switching amplifier (a so-called class E amplifier) including one transistor (not illustrated) serving as a switching element. The control signal CTL for power transmission is supplied from the control section 112 to the AC signal generating circuit 111. This control signal CTL is a pulse signal having a predetermined duty ratio, as illustrated in FIG. 3. Further, for example, as illustrated in Parts (A) and (B) of FIG. 4, the pulse width modulation to be described later may be performed, by controlling this duty ratio in the control signal CTL.

In the AC signal generating circuit 11, with such a configuration, the above-described transistor performs ON/OFF operation (switching operation based on a predetermined frequency and duty ratio), according to the control signal CTL for power transmission. In other words, the ON/OFF operation of the transistor serving as the switching element is controlled using the control signal CTL supplied from the control section 112. As a result, for example, the AC signal Sac (AC power) may be generated based on a DC signal Sdc inputted from the external power source 9 side, and the generated AC signal Sac may be supplied to the power transmission section 110.

(Power Receiving Section 210)

The power receiving section 210 includes the power receiving coil L2 provided to receive electric power (from a magnetic flux) transmitted from the power transmission section 110, and also includes the capacitors $C2p$ and $C2s$ that form, together with this power receiving coil L2, the LC resonance circuit. The capacitor $C2p$ is electrically connected to the power receiving coil L2 in parallel, and the capacitor $C2s$ is electrically connected to the power receiving coil L2 in series. In other words, one end of the capacitor $C2s$ is connected to one end of the capacitor $C2p$ and one end of the power receiving coil L2. Further, the other end of the capacitor $C2s$ is connected to one input terminal in the rectifier circuit 211, and the other end of the power receiving coil L2 as well as the other end of the capacitor C2p are connected to the other input terminal in the rectifier circuit 211.

The LC resonance circuit configured of the power receiving coil L2 as well as the capacitors C2p and C2s, and the above-described LC resonance circuit configured of the power transmission coil L1 as well as the capacitors C1p and C1s are magnetically coupled to each other. As a result, the LC resonance operation is performed based on a resonance frequency that is substantially the same as the high-frequency electric power (the AC signal Sac) generated by the AC signal generating circuit 111.

(Rectifier Circuit 211)

Here, the rectifier circuit 211 is configured using four rectifier elements (diodes) D1 to D4. Specifically, an anode of the rectifier element D1 and a cathode of the rectifier element D3 are connected to the one input terminal in the rectifier circuit 211, and a cathode of the rectifier element D1 and a cathode of the rectifier element D2 are connected to an output terminal in the rectifier circuit 211. Further, an anode of the rectifier element D2 and a cathode of the rectifier element D4 are connected to the other input terminal in the rectifier circuit 211, and an anode of the rectifier element D3 and an anode of the rectifier element D4 are grounded. In the rectifier circuit 211, with such a configuration, the AC power supplied from the power receiving section 210 is rectified, and received electric power P2 that is the DC power is supplied to the voltage stabilizer 212.

(Charging Circuit 213)

The charging circuit 213 performs the charging to the battery 214 as described above, based the DC power (the received electric power P2) after the voltage stabilization. This charging circuit 213 also incorporates, here, a lighting control section 215A in the state informing section 215 that will be described below. It is to be noted that this lighting control section 215A may be configured of, for example, a microcomputer.

(State Informing Section 215)

The state informing section 215 also uses the DC power (the received electric power P2) after the voltage stabilization, to inform the above-described device state to the outside. As in illustrated in FIG. 3, this state informing section 215 includes a light-emission element (a lighting section) 215L configured of a light emitting diode (LED) or the like, the above-described lighting control section 215A, and a temperature sensor 215B (a state detection section).

The light-emission element 215L is an element playing a role of informing the device state (each of the state of charging, the state following completion of charging, and the abnormal state, which have been described above), according to the lighting state (for example, each of lighting, light extinction, and blinking). In this light-emission element 215L, an anode is connected to a connection line between the charging circuit 213 and the load 22, and here, a cathode thereof is connected to a terminal of the lighting control section 215A, so that a cathodic potential is controlled by the lighting control section 215A.

The temperature sensor 215B is an element provided to detect the abnormal state (for example, an abnormal state due to heat) of the battery 214 by temperature. A detection result (a detection result such as presence or absence of the abnormal state in the battery 214, corresponding to a value of the temperature) obtained by this temperature sensor 215B is supplied to the lighting control section 215A.

The lighting control section 215A controls the lighting state of this light-emission element 215L (performs lighting control) by, here, controlling the cathodic potential of the light-emission element 215L, based on the detection result supplied from the temperature sensor 215B, such as the presence or absence of the abnormal state in the battery 214. Specifically, for example, by setting the cathodic potential of the light-emission element 215L to a ground potential (a grounding potential), a current 12 illustrated in FIG. 3 is allowed to flow to the light-emission element 215L, so that the light-emission element 215L is turned on. Further, by setting this cathodic potential to an electric potential other than the ground potential, the current 12 is not allowed to flow, so that the light-emission element 215L is turned off. It is to be noted that this lighting control section 215A also uses the DC power (the received electric power P2) after the voltage stabilization, to perform such operation (the lighting control).

Here, when the abnormal state of the battery 214 is detected using the temperature sensor 215B, the state informing section 215 of the present embodiment informs the abnormal state to the outside, by using the received electric power P2 received from the feed unit 1, as will be described later.

[Functions and Effects of Feed System 4]

(1. Summary of Overall Operation)

In this feed system 4, the predetermined high-frequency electric power (the AC signal Sac) used to perform the electric power transmission is supplied from the high-frequency power generating circuit 111 in the feed unit 1, to the power transmission coil L1 and the capacitors C1p and C1s (the LC resonance circuit) in the power transmission section 110. This causes the magnetic field (the magnetic flux) in the power transmission coil L1 in the power transmission section 110. At this moment, when the electronic devices 2A and 2B each serving as a device to be fed (a device to be charged) are placed on (or, in proximity to) the top surface (the feeding surface S1) of the feed unit 1, the power transmission coil L1 in the feed unit 1 and the power receiving coil L2 in each of the electronic devices 2A and 213 are in proximity to each other in the vicinity of the feeding surface S1.

In this way, when the power receiving coil L2 is placed in proximity to the power transmission coil L1 generating the magnetic field (the magnetic flux), an electromotive force is generated in the power receiving coil L2 by being induced by the magnetic flux generated by the power transmission coil L1. In other words, due to electromagnetic induction or magnetic resonance, the magnetic field is generated by forming interlinkage with each of the power transmission coil L1 and the power receiving coil L2. As a result, electric power transmission from the power transmission coil L1 side (a primary side, the feed unit 1 side, or the power transmission section 110 side) to the power receiving coil L2 side (a secondary side, the electronic devices 2A and 2B side, or the power receiving section 210 side) is performed (see the arrow P1 in FIGS. 2 and 3). At this moment, the power transmission coil L1 on the feed unit 1 side and the power receiving coil L2 on the electronic devices 2A and 2B side are magnetically coupled to each other by the electromagnetic induction or the like, so that the LC resonance operation is performed in the above-described LC resonance circuits.

Then, in each of the electronic devices 2A and 2B, the AC power received by the power receiving coil L2 is supplied to the rectifier circuit 211, the voltage stabilizer 212, and the charging circuit 213, and the following charging operation is performed. That is, after this AC power is converted into predetermined DC power by the rectifier circuit 211, and the voltage stabilization operation is performed by the voltage stabilizer 212, the charging to the battery 214 based on this DC power is performed by the charging circuit 213. In this way, in each of the electronic devices 2A and 2B, the charging operation based on the electric power received by the power receiving section 210 is performed.

In other words, in the present embodiment, at the time of charging the electronic devices 2A and 2B, terminal connection to an AC adapter or the like, for example, may be unnecessary, and it is possible to start the charging easily by merely placing the electronic devices 2A and 2B on (or in proximity to) the feeding surface S1 of the feed unit 1 (non-contact feeding is performed). This reduces burden on a user.

Figure 5:
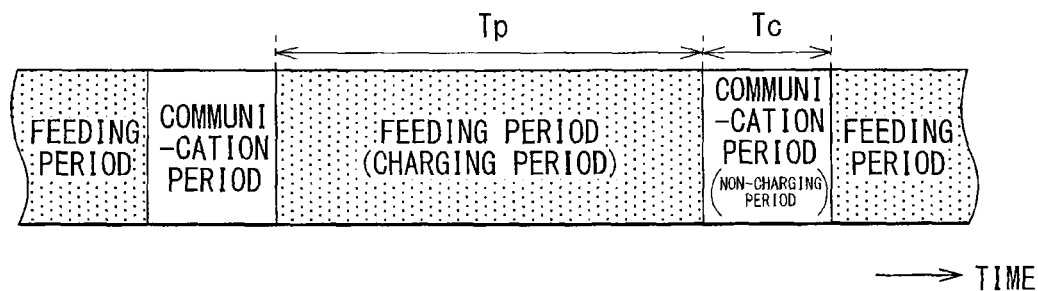
FIG. 5 is a timing chart illustrating an example of each of a feeding period and a communication period.

Further, as illustrated in, for example, FIG. 5, at the time of such feeding operation, a feeding period Tp (a charging period for the battery 214) and a communication period Tc (a non-charging period) are time-divisionally periodic (or aperiodic). In other words, the control section 112 and the control section 216 perform the control so that the feeding period Tp and the communication period Tc are set to be time-divisionally periodic (or aperiodic). Here, this communication period Tc is a period in which the predetermined mutual communication operation (communication operation for authentication between devices, feeding efficiency control, and the like) using the power transmission coil L1 and the power receiving coil L2 is performed between the primary-side device (the feed unit 1) and the secondary-side device (the electronic devices 2A and 2B) (see the arrow C1 in FIGS. 2 and 3). It is to be noted that a time ratio between the feeding period Tp and the communication period Tc may be, for example, about 9:1.

Here, in this communication period Tc, the communication operation using the pulse width modulation in the AC signal generating circuit 111 may be performed, for example. Specifically, the duty ratio of the control signal CTL in the communication period Tc is set based on predetermined modulation data, so that the communication based on the pulse width modulation is performed. It is to be noted that, it is theoretically difficult to perform frequency modulation at the time of resonance operation in the power transmission section 110 and the power receiving section 210 described above. Therefore, such pulse width modulation is used to achieve communication operation easily.

(2. State Informing Operation)

Further, in the feed system 4 of the present embodiment, a means (the state informing section 215) of informing the device state of each of the electronic devices 2A and 2B to the outside is provided in each of the electronic devices 2A and 2B. This state informing section 215 informs such a device state to the outside, by using the received electric power P2 received from the feed unit 1.

Specifically, each of the state of charging and the state following completion of charging to the battery 214 by the charging circuit 213, as well as the abnormal state of the battery 214 is distinguished according to, here, the lighting state (each state of lighting, light extinction, and blinking) of the light-emission element 215L, and the distinguished state is informed. In other words, for example, the lighting control section 215A in this state informing section 215 may control the light-emission element 215L to be turned on in the state of charging, control the light-emission element 215L to be turned off in the state following completion of charging, and control the light-emission element 215L to blink in the abnormal state.

In the electronic devices 2A and 2B, by performing such state informing operation by the state informing section 215, it is possible to inform the device state at that point in time to a user, etc. and therefore, an improvement in convenience of the user, etc. is achieved. The state informing operation of the present embodiment will be described below in detail, in comparison with a comparative example.

2-1. Comparative Example

Figure 6:
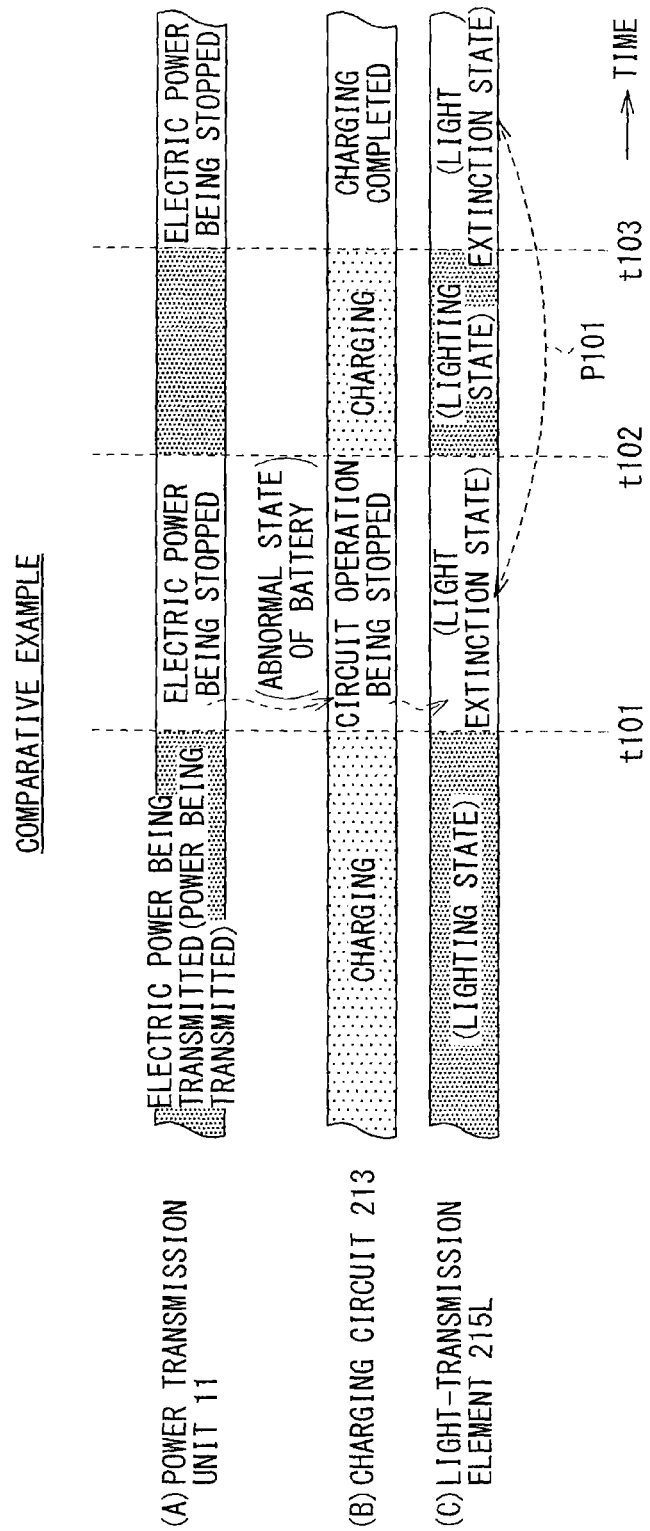
FIG. 6 is a timing chart illustrating an operation example in a feed system according to a comparative example.
Figure 7:
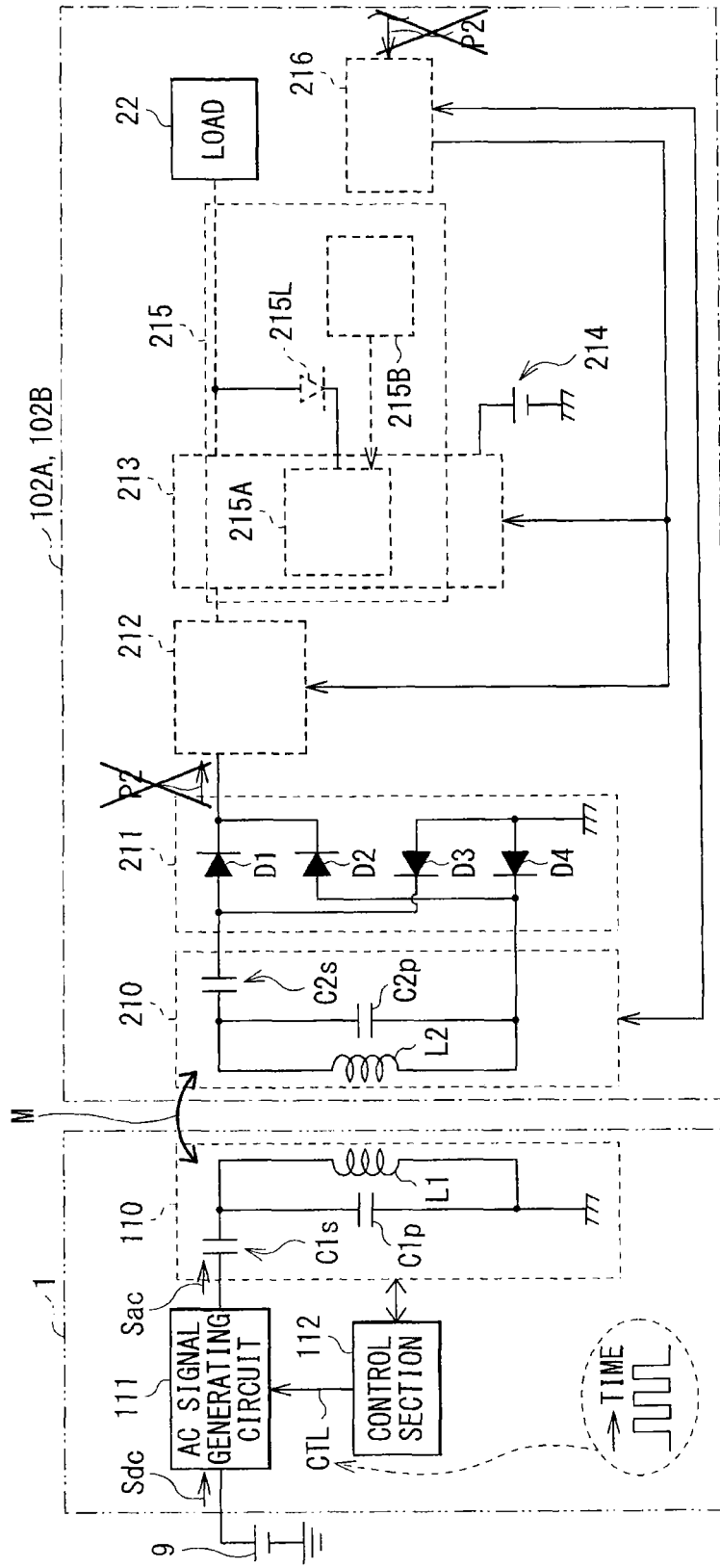
FIG. 7 is a circuit diagram illustrating an operation example in the feed system according to the comparative example.

FIG. 6 illustrates an operation example in a feed system (a feed system 104) according to the comparative example, in a timing chart. In this FIG. 6, Part (A) illustrates an operating state in the power transmission unit 11, Part (B) illustrates an operating state in the charging circuit 213, and Part (C) illustrates an operating state in the light-emission element 215L. It is to be noted that, as illustrated in FIG. 7, this feed system 104 of the comparative example includes the feed unit 1, as well as electronic devices 102A and 102B according to the comparative example.

In this comparative example, as illustrated in Parts (A) to (C) of FIG. 6, at first, electric power transmission (power transmission) from the power transmission unit 11 in the feed unit 1 to the electronic devices 102A and 102B is performed in a period to timing t101. Therefore, in the charging circuit 213, charging operation for the battery 214 is performed using charging electric power P2 received at this time. Further, the lighting control section 215A built in this charging circuit 213 also uses this charging electric power P2 to perform lighting control so that the light-emission element 215L enters the lighting state, and information indicating that the battery 214 is being charged is thereby informed to the outside.

Next, in a period from the timing t101 to timing t102, an abnormal state due to heat, etc. in the battery 214 is detected by the temperature sensor 215B. Therefore, as indicated by an arrow of a broken line in FIG. 6, the electric power transmission (power transmission) from the power transmission unit 1 to the electronic devices 102A and 102B is stopped. Thus stopping the power transmission operation halts the supply of the received electric power P2 to the voltage stabilizer 212, the charging circuit 213, the state informing section 215, the control section 216, and the like in each of the electronic devices 102A and 102B, as indicated by "X" in FIG. 7, for example. As a result, as illustrated in Parts (B) and (C) of FIG. 6 as well as FIG. 7, the operation of the charging circuit 213, the lighting control section 215A built therein, and the like is stopped, and the state informing operation using the light-emission element 215L is also stopped. In other words, in this period from the timing t101 to the timing t102, the light-emission element 215L remains in the light extinction state.

Subsequently, in a period from the timing t102 to timing t103, returning of the battery 214 from the abnormal state to a normal state is detected by the temperature sensor 215B and therefore, the operating state is similar to that in the above-described period to the timing t101. In other words, as illustrated in Parts (A) to (C) of FIG. 6, the electric power transmission (power transmission) from the power transmission unit 11 to the electronic devices 102A and 102B is resumed and as a result, in the charging circuit 213 and the lighting control section 215A, the charging operation and the lighting control are performed using the received electric power P2. Therefore, the light-emission element 215L is in the lighting state also in this period from the timing t102 to the timing t103, and information indicating that the battery 214 is being charged is informed to the outside.

Afterwards, in a period following the timing t103, as illustrated in Parts (A) to (C) of FIG. 6, the charging operation for the battery 214 is completed, and the operation of the electric power transmission (power transmission) from the power transmission unit 11 to the electronic devices 102A and 102B is also stopped. Therefore, in this period following the timing t103, the light-emission element 215L is in the light extinction state, and information indicating that the charging to the battery 214 has been completed is informed to the outside.

In this way, in the feed system 104 of the comparative example, also in the period of the abnormal state of the battery 214, the electric power transmission (power transmission) from the power transmission unit 11 to the electronic devices 102A and 102B is stopped and therefore, the state informing operation is stopped due to the absence of the received electric power P2. As a result, as indicated by an arrow P101 in FIG. 6, the light-emission element 215L is in the light extinction state both in this period of the abnormal state of the battery 214 and the period following the completion of the charging. In other words, for a user, etc., it is impracticable to distinguish between the information about the abnormal state and the information about other device state (here, the charging-completed state) and therefore, the user, etc. may falsely determine the device state. In this way, in the feed system 104 of the comparative example, convenience of the user decreases.

It is to be noted that, it is reasonable to stop the charging operation for the battery 214 in this way when the abnormal state of the battery 214 occurs. However, in a non-contact feed system in particular, the following can be said unlike a wire feed system. That is, performing non-contact electric power supply to a device to be fed in which the battery 214 in such an abnormal state is reluctant operation. For these reasons, it can be said that, in a non-contact feed system, when an abnormal state of a battery in a device to be fed occurs, non-contact electric power transmission (power transmission) operation is stopped like this comparative example, and as a result, it is presumably impracticable to distinguish a device state.

2-2. Present Embodiment

In contrast, in the feed system 4 of the present embodiment, the issue of the comparative example described above is addressed as follows.

Figure 8:
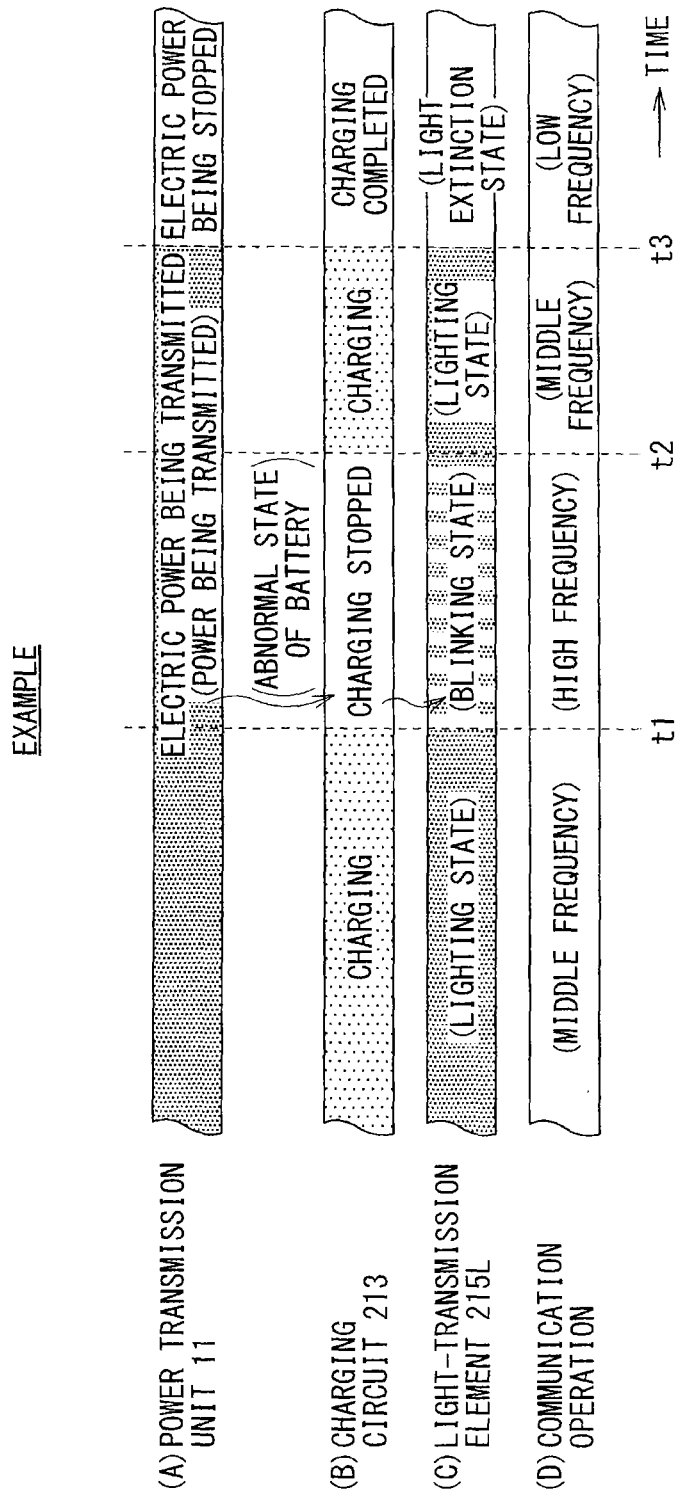
FIG. 8 is a timing chart illustrating an operation example (Example) in the feed system illustrated in FIG. 3.

FIG. 8 illustrates an operation example in the feed system 4 of the present embodiment, in a timing chart. In this FIG. 8, Part (A) illustrates an operating state in the power transmission unit 11, Part (B) illustrates an operating state in the charging circuit 213, Part (C) illustrates an operating state in the light-emission element 215L, and Part (D) illustrates a state of the communication operation between the feed unit 1 and each of the electronic devices 2A and 2B.

In the operation example illustrated in FIG. 8 as well, like the above-described operation example (the comparative example) illustrated in FIG. 6, the battery 214 being in a normal state is detected by the temperature sensor 215B, in a period to timing t1 and a period from timing t2 to timing t3. Therefore, the electric power transmission (power transmission) from the power transmission unit 11 to the electronic devices 2A and 2B is performed, and in the charging circuit 213 and the lighting control section 215A, the charging operation and the lighting control are performed using the received electric power P2. Hence, the light-emission element 215L enters the lighting state, and information indicating that the battery 214 is being charged is informed to the outside.

Further, in a period following the timing t3, like the operation example illustrated in FIG. 6, the charging operation for the battery 214 is completed, and the operation of the electric power transmission (power transmission) from the power transmission unit 11 to the electronic devices 102A and 102B is stopped. Therefore, the light-emission element 215L is in the light extinction state, and information indicating a state following the completion of the charging to the battery 214 is informed to the outside.

However, in the present embodiment, unlike the above-described comparative example, operation as indicated by an arrow of a solid line in FIG. 8 is performed in a period from the timing t1 to the timing t2. That is, even if the abnormal state of the battery 214 is detected by the temperature sensor 215B, the electric power transmission (power transmission) from the power transmission unit 11 to the electronic devices 2A and 2B is continued, and the state informing section 215 informs the abnormal state to the outside, by using the received electric power P2 at that time. In other words, unlike the comparative example, the absence of the received electric power P2 is avoided by the continuation of the electric power transmission, and as a result, the state informing operation is not stopped even in a period in which the abnormal state of the battery 214 is occurring (stopping the state informing operation is avoided). In this way, in the present embodiment, the state informing operation is performed based on an idea of "allowing the electric power transmission to continue rather than stopping the electric power supply, at the time of occurrence of the abnormal state", which is an idea opposite to that of the comparative example.

It is to be noted that control of thus continuing the electric power transmission may be performed, for example, by utilizing the above-described communication operation between the control section 112 in the feed unit 1 and the control section 216 in each of the electronic devices 2A and 2B. In other words, for example, by the communication between the feed unit 1 and each of the electronic devices 2A and 2B, the control section 112 may perceive occurrence of the abnormal state in the battery 214 in each of the electronic devices 2A and 2B, and perform control so that the electric power transmission by the power transmission section 110 is continued even at the time of such occurrence of the abnormal state. In this way, when the abnormal state of the battery 214 is detected in each of the electronic devices 2A and 2B, the abnormal state being detected is notified to the feed unit 1 side, by utilizing the communication. However, instead of performing such control of continuing the electric power transmission by utilizing the communication, the feed unit 1 side may simply perform the electric power transmission, without perceiving the state of the battery 214 on the electronic devices 2A and 2B side (the normal state or not).

In this way, in the state informing operation of the present embodiment, as illustrated in, for example, Part (C) of FIG. 8, the light-emission element 215L is turned on in the state of charging, the light-emission element 215L is turned off in the state following completion of charging, and the light-emission element 215L is caused to blink in the abnormal state, by the lighting control performed by the lighting control section 215A. Therefore, false determination of the device state by a user, due to impracticability of distinguishing between the information about the abnormal state and the information about other device state (here, the charging-completed state), and the like, is prevented unlike the above-described comparative example.

It is to be noted that, in the present embodiment as well, at this time, when the abnormal state of the battery 214 is detected, the charging circuit 213 stops the charging to the battery 214 as illustrated in Part (B) of FIG. 8, in a manner similar to that of the comparative example. Further, the charging circuit 213 resumes the charging to the battery 214, when returning of the battery 214 from the abnormal state to the normal state is detected.

(3. Regarding Setting of Communication Operation)

Further, in the present embodiment, as illustrated in, for example, Part (D) of FIG. 8, preferably, the communication operation between the feed unit 1 and each of the electronic devices 2A and 2B may be set. It is to be noted that such setting (control) of the communication operation may be performed, for example, by the control section 112 in the feed unit 1, and the control section 216 in each of the electronic devices 2A and 2B.

Specifically, at first, the communication operation (the communication period Tc) may be preferably set to continue even after the charging to the battery 214 by the charging circuit 213 is completed. This is because, by performing such communication operation regularly even after the charging is completed, the feed unit 1 and each of the electronic devices 2A and 2B are allowed to mutually perceive the operating state in the feed system 4 (the device states of the feed unit 1 as well as the electronic devices 2A and 2B), and take appropriate actions accordingly.

Further, at this time, as illustrated in Part (D) of FIG. 8, preferably, the communication operation (the communication period Tc) may be set to a low frequency in the period following the completion of charging, as compared with the period of charging. Furthermore, preferably, the communication operation (the communication period Tc) may be set to a high frequency in the period of the abnormal state, as compared with the period of the normal state. For these reasons, in this operation example, the communication operation is set to a middle frequency in the period of charging, the communication operation is set to a low frequency in the period following the completion of charging, and the communication operation is set to a high frequency in the period of the abnormal state. This is because it is not necessary to perceive each other's device states very frequently in the period following the completion of charging, whereas it is necessary to perceive each other's device states frequently in the period of the abnormal state to deal therewith, as compared with the normal state.

As described above, in the present embodiment, even when the abnormal state is detected as the device state of each of the electronic devices 2A and 2B, the electric power transmission using a magnetic field by the power transmission section 110 is continued in the feed unit 1, and in the electronic devices 2A and 2B, the abnormal state is informed to the outside by using the electric power (the received electric power P2) transmitted using the magnetic field. This makes it possible to prevent false determination of the device state by a user, due to, for example, impracticability of distinguishing between the information about the abnormal state and the information about other device state. Therefore, it is possible to improve convenience of the user, when the electric power transmission using a magnetic field is performed.

<Modifications>

Technology of the present disclosure has been described above with reference to the embodiment, but the present technology is not limited to this embodiment and may be variously modified.

For example, the description has been provided using various coils (the power transmission coil, and the power receiving coil) in the above-described embodiment, but various kinds of configurations may be used as the configurations (the shapes) of these coils. In other words, each coil may have, for example, a shape such as a spiral shape, a loop shape, a bar shape using a magnetic substance, an α-winding shape in which a spiral coil is folded to be in two layers, a spiral shape having more multiple layers, a helical shape in which a winding is wound in a thickness direction, etc. In addition, each coil may be not only a winding coil configured using a wire rod having conductivity, but also a pattern coil having conductivity and configured using, for example, a printed circuit board, a flexible printed circuit board, etc.

Further, in the above-described embodiment, an electronic device has been described as an example of the device to be fed, but the device to be fed is not limited thereto and may be any type of device to be fed other than electronic devices (e.g. a vehicle such as an electric car).

Furthermore, in the above-described embodiment, each component of the feed unit and the electronic device has been specifically described. However, it is not necessary to provide all the components, or other component may be further provided. For example, a communication function, a function of performing some kind of control, a display function, a function of authenticating a secondary-side device, a function of determining that a secondary-side device is on a primary-side device, a function of detecting a mixture such as dissimilar metal, and/or the like may be provided in the feed unit and/or the electronic device.

In addition, the above-described embodiment has been described by taking mainly the case in which the plurality of (two or more) electronic devices are provided in the feed system, as an example. However, without being limited to this case, only one electronic device may be provided in the feed system.

Moreover, the above-described embodiment has been described by taking the charging tray for the small electronic device (the CE device) such as a mobile phone, as an example of the feed unit. However, the feed unit is not limited to such a home charging tray, and may be applicable to battery chargers of various kinds of electronic devices. In addition, it is not necessary for the feed unit to be a tray, and may be, for example, a stand for an electronic device such as a so-called cradle.

(Example of Feed System Performing Non-Contact Electric Power Transmission Using Electric Field)

Further, the above-described embodiment has been provided by taking, as an example, the case of the non-contact feed system that performs the non-contact electric power transmission (feeding) using a magnetic field, from the feed unit serving as the primary-side device performs to the electronic device serving as the secondary-side device, but this is not limitative. In other words, contents of the present disclosure are applicable also to a feed system that performs non-contact electric power transmission using an electric field (electric field coupling), from a feed unit serving as a primary-side device to an electronic device serving as a secondary-side device. In this case, it is possible to obtain effects similar to those of the above-described embodiment.

Figure 9:
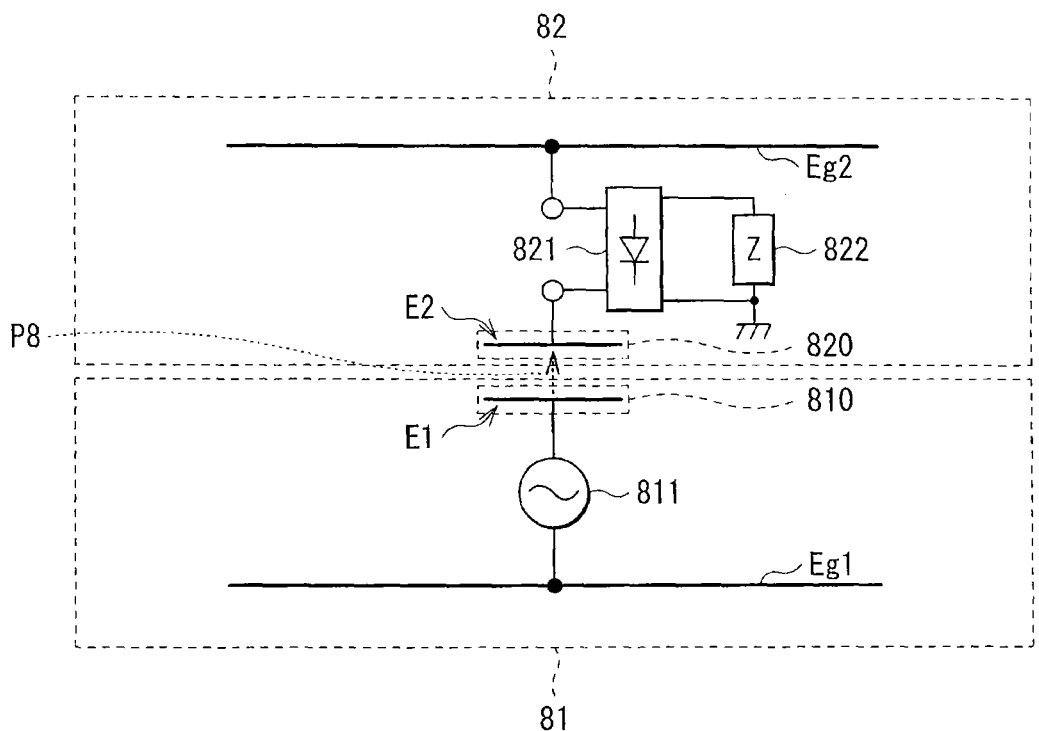
FIG. 9 is a block diagram illustrating a schematic configuration example of a feed system according to a modification.

Specifically, for example, a feed system illustrated in FIG. 9 may include one feed unit 81 (a primary-side device) and one electronic device 82 (a secondary-side device). The feed unit 81 mainly includes a power transmission section 810, an AC signal source 811 (an oscillator), and an earth electrode Eg1. The power transmission section 810 includes a power transmission electrode E1 (a primary-side electrode). The electronic device 82 mainly includes a power receiving section 820, a rectifier circuit 821, a load 822, and an earth electrode Eg2. The power receiving section 820 includes a power receiving electrode E2 (a secondary-side electrode). To be more specific, this feed system includes two sets of electrodes, i.e., the power transmission electrode E1 and the power receiving electrode E2, as well as the earth electrode Eg1 and the earth electrode Eg2. In other words, the feed unit 81 (the primary-side device) and the electronic device 82 (the secondary-side device) each include, inside thereof, an antenna having a structure of an asymmetric pair of electrodes such as a monopole antenna.

Figure 10:
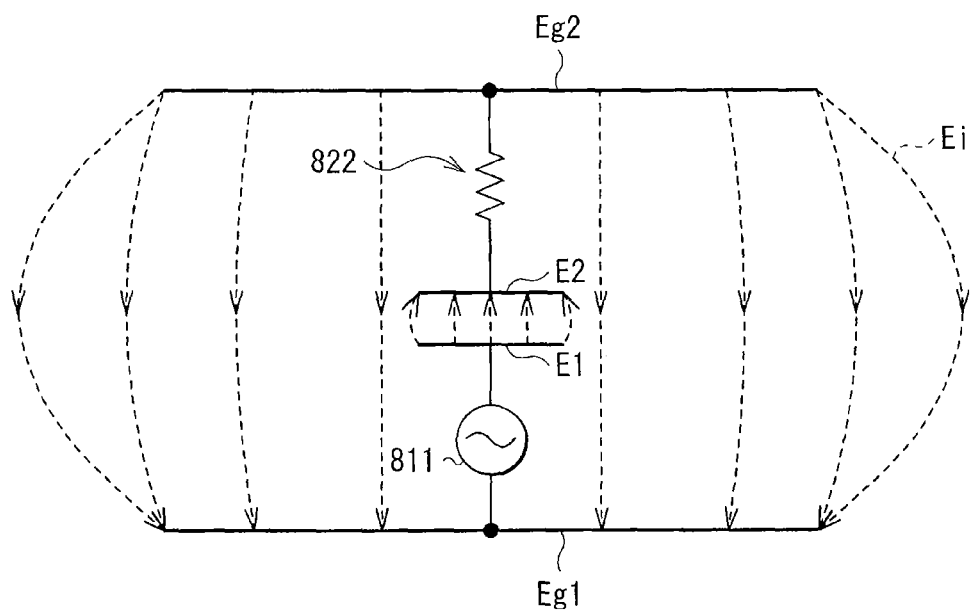
FIG. 10 is a schematic diagram illustrating a propagation mode example of an electric field in the feed system illustrated in FIG. 9.

In the feed system having such a configuration, when the power transmission electrode E1 and the power receiving electrode E2 face each other, the above-described non-contact antennas are coupled to each other (electric field coupling with respect to each other occurs along a vertical direction of the electrodes). Then, an induction field is generated therebetween, and electric power transmission using the electric field is performed (see electric power P8 illustrated in FIG. 9). Specifically, for example, as schematically illustrated in FIG. 10, the generated electric field (an induction field Ei) may propagate from the power transmission electrode E1 side towards the power receiving electrode E2 side, and the generated induction field Ei may propagate from the earth electrode Eg2 side towards the earth electrode Eg1 side. In other words, between the primary-side device and the secondary-side device, a loop path of the generated induction field Ei is formed. In such a non-contact electric power supply system using an electric field, by applying a technique similar to that of the above-described embodiment, it is possible to obtain similar effects.

It is to be noted that the present technology may also have the following configurations.

(1) An electronic device including:
a power receiving section configured to receive electric power transmitted using a magnetic field or an electric field; and
a state informing section configured to inform a device state of the electronic device, by using the electric power received by the power receiving section,
wherein when an abnormal state is detected as the device state, the state informing section also informs the abnormal state by using the received electric power.
(2) The electronic device according to (1), further including:
a secondary battery; and
a charging section configured to perform charging to the secondary battery based on the received electric power,
wherein the charging section stops the charging to the secondary battery, when the abnormal state is detected.
(3) The electronic device according to (2), wherein the state informing section includes a state detection section configured to detect an abnormal state in the secondary battery, as the abnormal state.
(4) The electronic device according to (3), wherein the state detection section detects the abnormal state in the secondary battery, by temperature of the secondary battery.
(5) The electronic device according to any one of (2) to (4), wherein the charging section resumes the charging to the secondary battery, upon returning of the device state from the abnormal state to a normal state.
(6) The electronic device according to any one of (2) to (5), wherein the state informing section distinguishes each of a state of charging by the charging section, a state following completion of charging by the charging section, and the abnormal state, as the device state.
(7) The electronic device according to (6), wherein the state informing section includes a lighting section and a lighting control section, the lighting section being configured to inform the device state according to a lighting state, and the lighting control section being configured to control the lighting state of the lighting section.
(8) The electronic device according to (7), wherein the lighting control section controls
the lighting section to be turned on, in the state of charging,
the lighting section to be turned off, in the state following completion of charging, and
the lighting section to blink, in the abnormal state.
(9) The electronic device according to any one of (2) to (8), wherein a feeding period and a communication period are time-divisionally set, the feeding period being a period in which electric power transmission from a feed unit is performed using a magnetic field or an electric field, and the communication period being a period in which predetermined communication with the feed unit is performed.
(10) The electronic device according to (9), wherein the communication period is set to continue, even after the charging to the secondary battery by the charging section is completed.
(11) The electronic device according to (10), wherein the communication period is set to a low frequency in a period following the completion of charging, as compared with a period in which the secondary battery is being charged.
(12) The electronic device according to (10) or (11), wherein the communication period is set to a high frequency in a period of the abnormal state, as compared with a period in which the device state is a normal state.
(13) The electronic device according to any one of (9) to (12), wherein when the abnormal state is detected, the abnormal state being detected is informed to the feed unit side, by utilizing the communication.
(14) A feed system including:
one or a plurality of electronic devices; and
a feed unit configured to perform electric power transmission using a magnetic field or an electric field, to the electronic device,
wherein the electronic device includes
a power receiving section configured to receive electric power transmitted from the feed unit, and
a state informing section configured to inform a device state of the electronic device, by using the electric power received by the power receiving section, and
when an abnormal state is detected as the device state, the state informing section also informs the abnormal state by using the received electric power.
(15) A feed unit including:
a power transmission section configured to perform electric power transmission using a magnetic field or an electric field, to a device to be fed; and
a control section configured to continue the electric power transmission by the power transmission section, even when an abnormal state in the device to be fed is detected.
(16) The feed unit according to (15), wherein the control section perceives occurrence of the abnormal state, by communication with the device to be fed.

The present application claims priority based on Japanese Patent Application No. 2011-260058 filed in the Japan Patent Office on Nov. 29, 2011, and Japanese Patent Application No. 2012-94335 filed in the Japan Patent Office on Apr. 18, 2012, the entire contents of each of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An electronic device comprising:
   a power receiving section configured to receive electric power transmitted using a magnetic field or an electric field; and
   a state informing section configured to inform a state of the electronic device, by using the electric power received by the power receiving section,
   wherein in an event an abnormal state is detected as the state of the electronic device, the state informing section also informs the abnormal state by using the received electric power,
   wherein a communication period is set in which predetermined communication with a feed unit is performed, and
   wherein the communication period is set to a low frequency in a period following completion of charging, as compared with a period in which a secondary battery of the electronic device is being charged.

2. The electronic device according to claim 1, further comprising:
   a secondary battery; and
   a charging section configured to perform charging to the secondary battery based on the received electric power,
   wherein the charging section stops the charging to the secondary battery, in an event the abnormal state is detected.

3. The electronic device according to claim 2, wherein the state informing section includes a state detection section configured to detect an abnormal state in the secondary battery, as the abnormal state.

4. The electronic device according to claim 3, wherein the state detection section detects the abnormal state in the secondary battery, by temperature of the secondary battery.

5. The electronic device according to claim 2, wherein the charging section resumes the charging to the secondary battery, upon returning of the state of the electronic device from the abnormal state to a normal state.

6. The electronic device according to claim 2, wherein the state informing section distinguishes each of a state of charging by the charging section, a state following completion of charging by the charging section, and the abnormal state, as the state of the electronic device.

7. The electronic device according to claim 6, wherein the state informing section includes a lighting section and a lighting control section, the lighting section being configured to inform the state of the electronic device according to a lighting state, and the lighting control section being configured to control the lighting state of the lighting section.

8. The electronic device according to claim 7, wherein the lighting control section controls
   the lighting section to be turned on, in the state of charging,
   the lighting section to be turned off, in the state following completion of charging, and
   the lighting section to blink, in the abnormal state.

9. The electronic device according to claim 2, wherein a feeding period and the communication period are time-divisionally set, the feeding period being a period in which electric power transmission from the feed unit is performed using a magnetic field or an electric field, and the communication period being a period in which predetermined communication with the feed unit is performed.

10. The electronic device according to claim 9, wherein the communication period is set to continue, even after the charging to the secondary battery by the charging section is completed.

11. The electronic device according to claim 10, wherein the communication period is set to a high frequency in a period of the abnormal state, as compared with a period in which the state of the electronic device is a normal state.

12. The electronic device according to claim 9, wherein in an event the abnormal state is detected, the abnormal state being detected is informed to the feed unit side, by utilizing the communication.

13. The electronic device according to claim 1, wherein the communication period is a period in which predetermined mutual communication operation using a power transmission section and the power receiving section is performed.

14. The electronic device according to claim 13, wherein the communication operation comprises authentication between electronic device and the feed unit, and feeding efficiency control.

15. The electronic device according to claim 1, wherein the state informing section includes a sound output via a speaker for informing the state of the electronic device.

16. A feed system comprising:
   one or a plurality of electronic devices; and
   a feed unit configured to perform electric power transmission using a magnetic field or an electric field, to the electronic device,
   wherein the electronic device includes:
      a power receiving section configured to receive electric power transmitted from the feed unit, and
      a state informing section configured to inform a state of the electronic device, by using the electric power received by the power receiving section,
      wherein in an event an abnormal state is detected as the state of the electronic device, the state informing section also informs the abnormal state by using the received electric power,
      wherein a communication period is set in which predetermined communication with the feed unit is performed, and
      wherein the communication period is set to a low frequency in a period following completion of charging, as compared with a period in which a secondary battery of the electronic device is being charged.

* * * * *